(12) United States Patent
Tu et al.

(10) Patent No.: US 12,468,502 B2
(45) Date of Patent: Nov. 11, 2025

(54) COMPUTER SYSTEM AND PROCESSING METHOD THEREOF OF SOUND SIGNAL

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW); Ming-Chun Yu, New Taipei (TW)

(73) Assignee: Acer Incorporated, New Taipei (TW)

( * ) Notice: Subject to any disclaimer, the term of this patent is extended or adjusted under 35 U.S.C. 154(b) by 505 days.

(21) Appl. No.: 17/987,880

(22) Filed: Nov. 16, 2022

(65) Prior Publication Data

US 2024/0118862 A1    Apr. 11, 2024

(30) Foreign Application Priority Data

Oct. 6, 2022   (TW) .................................. 111137994

(51) Int. Cl.
*G06F 3/16*       (2006.01)
*G06F 1/04*       (2006.01)
*G06F 1/3296*     (2019.01)
*H04R 3/00*       (2006.01)
*H04R 5/027*      (2006.01)
*H04S 1/00*       (2006.01)

(52) U.S. Cl.
CPC ............... *G06F 3/162* (2013.01); *G06F 1/04* (2013.01); *G06F 1/3296* (2013.01); *H04R 3/00* (2013.01); *H04R 5/027* (2013.01); *H04S 1/007* (2013.01); *H04S 2400/15* (2013.01)

(58) Field of Classification Search
CPC .......... G06F 3/162; G06F 1/04; G06F 1/3296; G06F 1/3215; G06F 1/3237; G06F 1/3287; H04R 3/00; H04R 5/027; H04R 1/406; H04R 5/04; H04S 1/007; H04S 2400/15; G10L 19/008
USPC ........................ 381/26, 91, 92, 122, 111–115
See application file for complete search history.

(56) References Cited

U.S. PATENT DOCUMENTS

| | | | |
|---|---|---|---|
| 7,856,283 B2 * | 12/2010 | Burk ....................... | H04R 3/005 370/498 |
| 2011/0112666 A1 * | 5/2011 | McFarland ............. | G06F 3/162 700/94 |
| 2014/0112501 A1 * | 4/2014 | Yeh ........................ | H04R 1/005 381/122 |
| 2016/0087596 A1 * | 3/2016 | Yurrtas .................... | H04R 1/04 381/111 |
| 2017/0142517 A1 * | 5/2017 | Borkhovik ............. | H04R 3/007 |

(Continued)

FOREIGN PATENT DOCUMENTS

| | | |
|---|---|---|
| CN | 103841493 | 6/2014 |
| CN | 113078902 | 7/2021 |

(Continued)

*Primary Examiner* — Xu Mei
(74) *Attorney, Agent, or Firm* — JCIPRNET (57) ABSTRACT

A computer system and a processing method thereof of sound signal are provided. The computer system includes a platform path controller (PCH), a high-definition audio (HDA) codec, and a digital microphone. The HDA codec is coupled to the PCH. The digital microphone is coupled to the PCH and the HDA codec. The digital microphone is used to generate sound signal. The HDA codec processes the sound signal from the digital microphone. Accordingly, the audio recording with high quality could be provided.

17 Claims, 12 Drawing Sheets

(56) References Cited

U.S. PATENT DOCUMENTS

| | | | |
|---|---|---|---|
| 2019/0163435 A1* | 5/2019 | Lambert | G06F 3/162 |
| 2020/0356335 A1* | 11/2020 | Xiao | G06F 3/162 |
| 2023/0007391 A1* | 1/2023 | Kanatsu | H04R 5/04 |

FOREIGN PATENT DOCUMENTS

| | | |
|---|---|---|
| TW | 202101018 | 1/2021 |
| TW | 202123222 | 6/2021 |

\* cited by examiner

COMPUTER SYSTEM AND PROCESSING METHOD THEREOF OF SOUND SIGNAL

CROSS-REFERENCE TO RELATED APPLICATION

This application claims the priority benefit of Taiwan application serial no. 111137994, filed on Oct. 6, 2022. The entirety of the above-mentioned patent application is hereby incorporated by reference herein and made a part of this specification.

BACKGROUND

Technical Field

The disclosure relates to an audio technology, and in particular to a computer system and a processing method thereof of sound signal.

Description of Related Art

Figure 1:
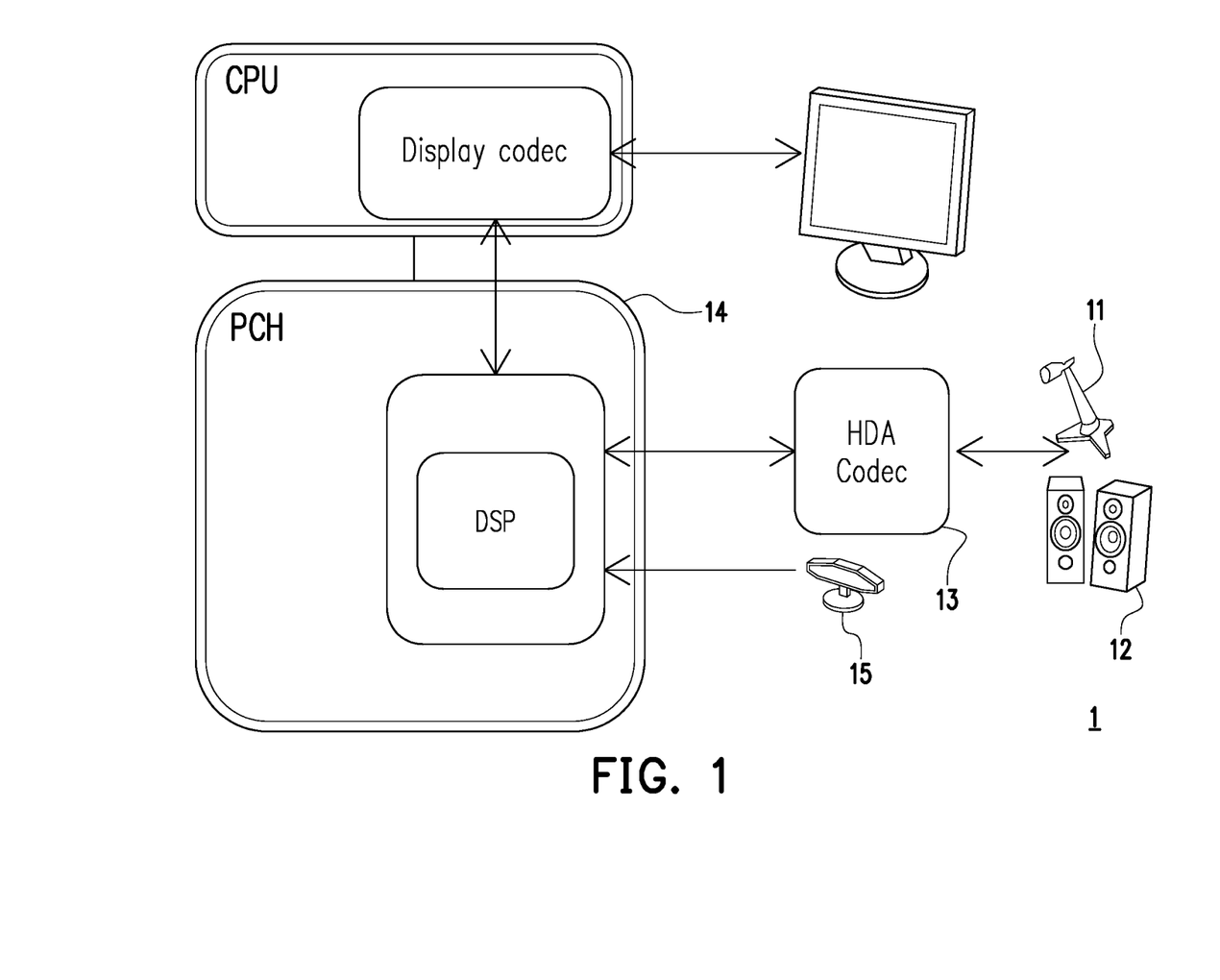
FIG. 1 is a schematic diagram of an audio architecture of a general computer system.

FIG. 1 is a schematic diagram of an audio architecture of a general computer system 1. Referring to FIG. 1, when the Wake on Voice (WoV) technology is used in the general audio architecture of the computer system 1, the system operates in a lower performance (for example, the best audio format is 16 bits and 48 kHz) operating mode, and a High-Definition Audio (HDA) codec 13 connected to an analog microphone 11 and a speaker 12 is turned off, to achieve the objective of power saving. Therefore, the Digital Microphone (DMIC) 15 built in the computer system 1 is connected to the Digital Signal Processor (DSP) 16 in a Platform Controller Hub (PCH) 14 to prevent the HDA codec 13 from being turned off and unable to operate.

When the computer system 1 is woken up in a high-performance (for example, the best audio format is 24 bits and 192 KHz) operating mode, the analog microphone 11 and the speaker 12 connected to the HDA codec 13 can utilize the resources of the HDA codec 13 to obtain better sound signal processing quality. However, the DMIC 15 is not connected to the HDA codec 13, so better sound signal processing quality cannot be obtained.

SUMMARY

In view of this, the embodiments of the application provide a computer system and a sound signal processing method thereof, in which a digital microphone and a High-Definition Audio (HDA) codec are connected in an audio structure to improve audio quality.

The computer system of the application includes (but not limited to) a platform path controller (PCH), HDA codec, and a digital microphone. The HDA codec is coupled to the PCH. The digital microphone is coupled to the PCH and the HDA codec. The digital microphone is used to generate sound signal. The HDA codec processes the sound signal from the digital microphone.

The method for processing a sound signal of the application includes (but not limited to) the following steps. A computer system as described above is provided. In response to a power state of the computer system being in a working state, the HDA codec is enabled to process the sound signal from the digital microphone. In response to the power state of the computer system being in a power saving state, the HDA codec is disabled to process the sound signal from the digital microphone.

Based on the above, the computer system and the processing method thereof of sound signal in the embodiment of the application provide an audio architecture that connects the digital microphone and the HDA codec, so that the HDA codecs can provide higher-quality audio processing for sound signals of the digital microphone. Besides, when the computer system is in a power-saving state, it only needs to process the sound signal of the digital microphone through the PCH to achieve the purpose of saving power.

In order to make the above-mentioned features and advantages of the application more obvious and easier to understand, the following embodiments are given and described in detail with the accompanying drawings as follows.

DESCRIPTION OF THE EMBODIMENTS

Figure 2:
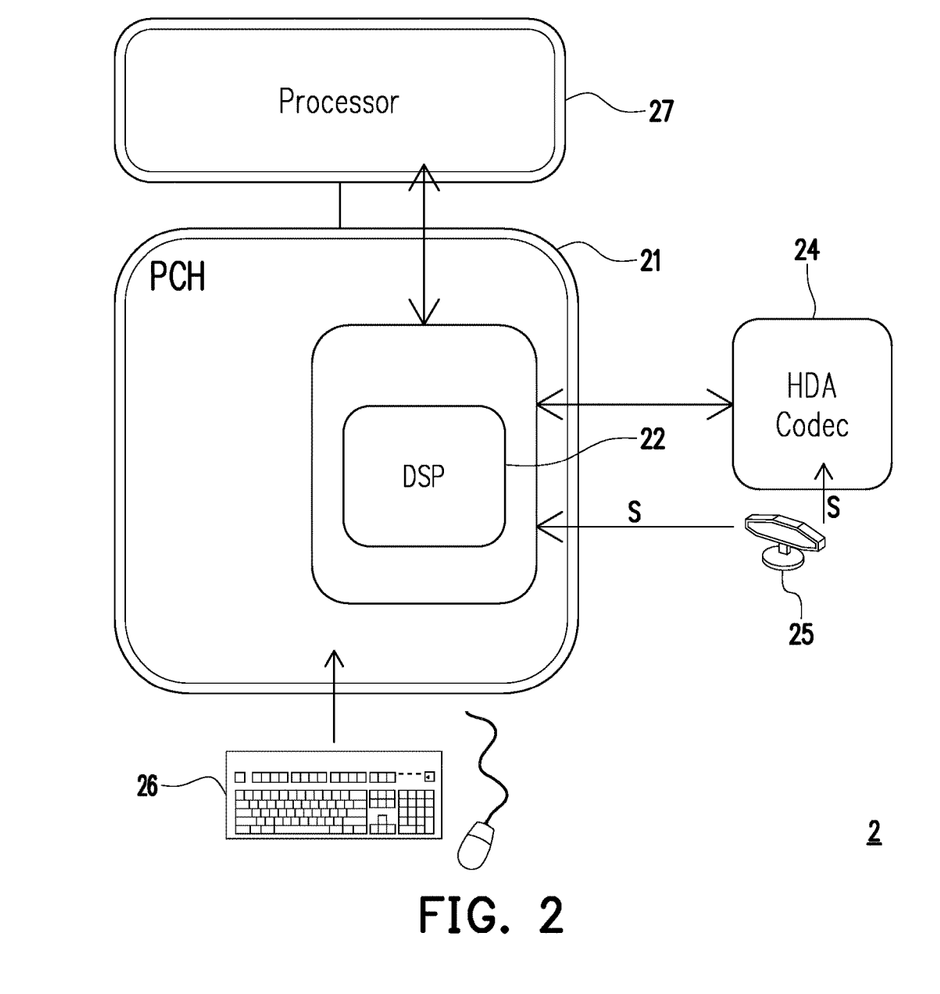
FIG. 2 is a schematic diagram of components of a computer system according to an embodiment of the application.

FIG. 2 is a schematic diagram of components of a computer system according to an embodiment of the application. Referring to FIG. 2, the computer system 2 includes (but not limit to) a platform path controller (PCH) 21, a high-definition audio (HDA) codec 24, a digital microphone 25, and a processor 27. The computer system 2 can be a desktop computer, a notebook computer, a smart phone, a tablet computer, a wearable device, a smart home appliance, a voice assistant device, or other electronic devices.

The PCH 21 includes a digital signal processor (DSP) 22. For example, provided by a high-resolution sound effect controller (not shown). In an embodiment, the DSP 22 is used to provide audio processing. For example, sound effects, noise suppression, echo cancellation or gain adjustment.

The HDA codec 24 is coupled to the PCH 21. In an embodiment, the HDA codec 24 is used to provide audio processing with sampling rates higher than 44.1 kHz or other sampling rates. For example, 192 kHz or 96 kHz. Alternatively, the HDA codec 24 is used to provide high sampling resolution audio processing. For example, 24 bits or 32 bits.

The digital microphone 25 may be a type of microphone such as dynamic, condenser, electret condenser or array. The digital microphone 25 can directly output the sound signal S of the digital pulse. The digital microphone 25 can also be a combination of other electronic components, analog-to-digital converters, filters, and audio processors that can receive sound waves (e.g., human voice, ambient sound, machine operation sound, etc.) and convert them into sound signals. In an embodiment, the digital microphone 25 is used to pick up/record the speaker to generate a sound signal S. Besides, the HDA codec 24 can handle the sound signal S from the digital microphone 25.

In an embodiment, the digital microphone 25 has a sampling rate of 22 kHz to 192 kHz and a bit rate of 24 bits. The polar pattern (i.e., beam direction) includes stereo, cardioid, bidirectional, and/or Omnidirectional, and has a sensitivity of −47 dBV/Pa. However, the specifications of the digital microphone 25 may still change.

The processor 27 is coupled to the PCH 21 and the HDA codec 24. The processor 27 may be a Central Processing Unit (CPU), a Graphic Processing unit (GPU), other programmable general-purpose or special-purpose microprocessors, a Digital Signal Processor (DSP), a programmable controller, Field Programmable Gate Array (FPGA), Application-Specific Integrated Circuit (ASIC), a neural network accelerator or other similar element or a combination of the above. In an embodiment, the processor 27 is used to execute all or part of the operations of the computer system 2, and can load and execute various code, software modules, files and data stored in the memory (not shown). In some embodiments, some operations in the method of the embodiment of the application may be implemented by different or the same processor 27.

In an embodiment, the computer system 2 further includes an input device 26. The input device 26 is coupled to the PCH 21, and is electrically connected to the processor 27. The input device 26 can be a keyboard, mouse, trackpad, or keys. In an embodiment, the input device 26 is used for receiving user operations. For example, a press, click or drag operation.

Figure 3:
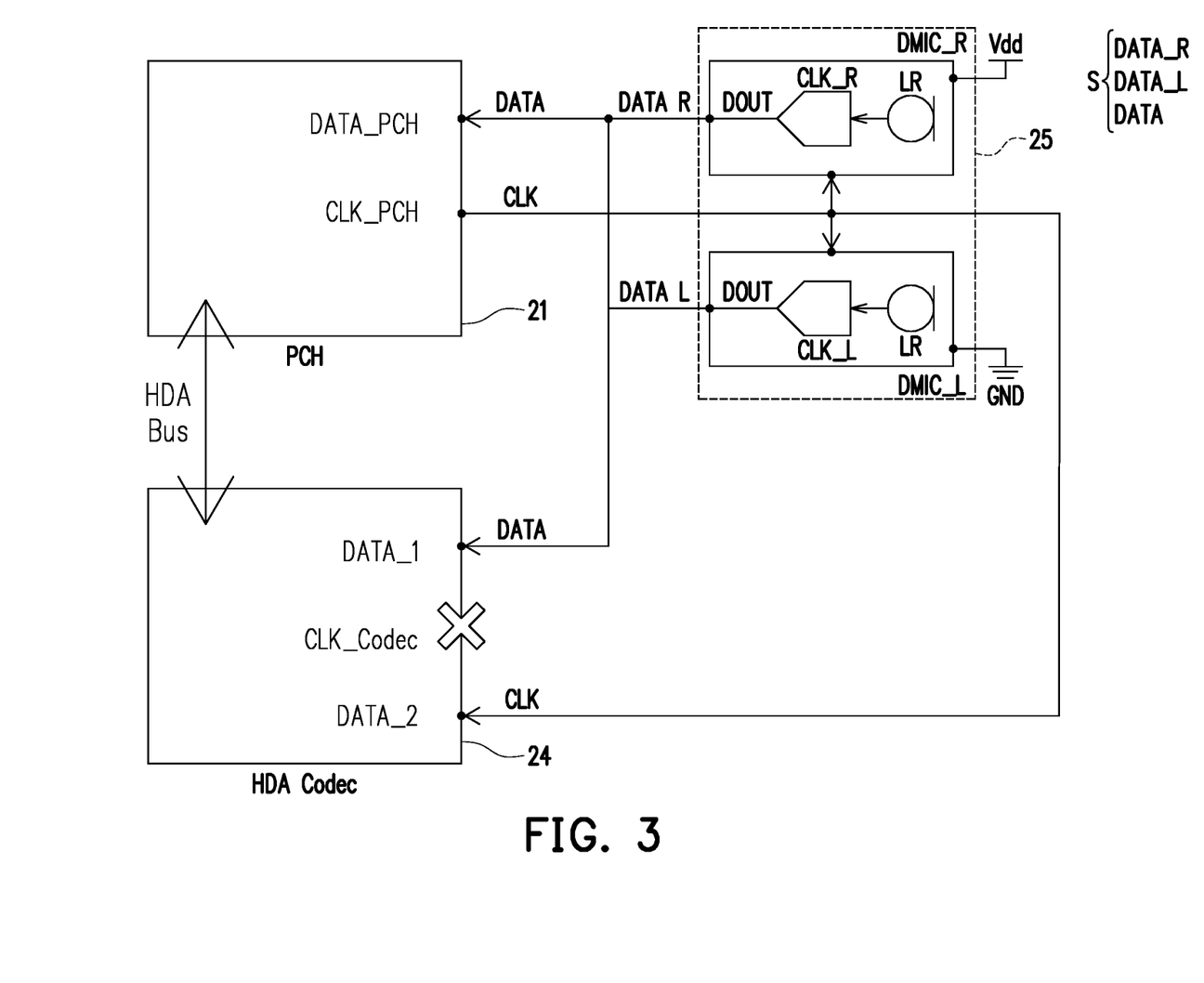
FIG. 3 is a hardware architecture diagram according to an embodiment of the application.

FIG. 3 is a hardware architecture diagram according to an embodiment of the application. Referring to FIG. 3, in an embodiment, the HDA codec 24 is coupled to the PCH 21 through a HDA Bus. The digital microphone 25 includes a left channel microphone DMIC_L and a right channel microphone DMIC_R. The channel selection pins LR of the left channel microphone DMIC_L and the right channel microphone DMIC_R are connected to ground (GND) or power supply (Vdd) respectively. The digital microphone 25 is directly connected to the PCH 21 and the HDA codec 24 through the Pulse-Density Modulated (PDM) transmission interface.

There are two types of PDM signals: a clock signal CLK and a sound signal DATA. The clock signal CLK is used to distinguish the left channel signal DATA_L and the right channel signal DATA_R. The sound signal DATA is the sound signal S recorded by the digital microphone 25.

The data pin of the digital microphone 25 (such as, the data pin DOUT of the left channel microphone DMIC_L and the right channel microphone DMIC_R) is coupled to the data pin DATA_PCH of the PCH 21 and the data pin DATA_1 of the HDA codec 24. The PCH 21 can receive the sound signal S from the digital microphone 25 via the data pin DATA_PCH, or the HDA codec 24 can receive the sound signal S from the digital microphone 25 via the data pin DATA_1 (such as, the right channel signal DATA_R and the left channel signal DATA_L output by the data pin DOUT of the digital microphone 25 form sound signal DATA). That is, the sound signal S/DATA is transmitted to the data pin DATA_PCH and the data pin DATA_1.

The clock pin CLK_PCH of the PCH 21 is coupled to the clock pin (such as, the clock pin CLK_L of the left channel microphone DMIC_L and the clock pin CLK_R of the right channel microphone DMIC_R) of the digital microphone 25 and the data pin DATA_2 of the HDA codec 24. The PCH 21 provides clock signal CLK (e.g., the clock frequency is 3.2 MHz) to both the digital microphone 25 and the HDA codec 24 via its clock pin CLK_PCH. That is, the clock signal CLK is transmitted to the clock pins CLK_L, CLK_R, and the data pin DATA_2. And the clock pin CLK Codec of the HDA codec 24 is not connected to the clock pin CLK_PCH and other components.

In an embodiment, in response to the power state of the computer system 2 being in a power saving state, the HDA codec is disabled. The power saving state is, for example, a hibernate, a sleep state, or a standby state. The term "disabled" means limited functionality, power off or standby whereby the sound signal S from the digital microphone 25 is no longer processed.

Figure 4:
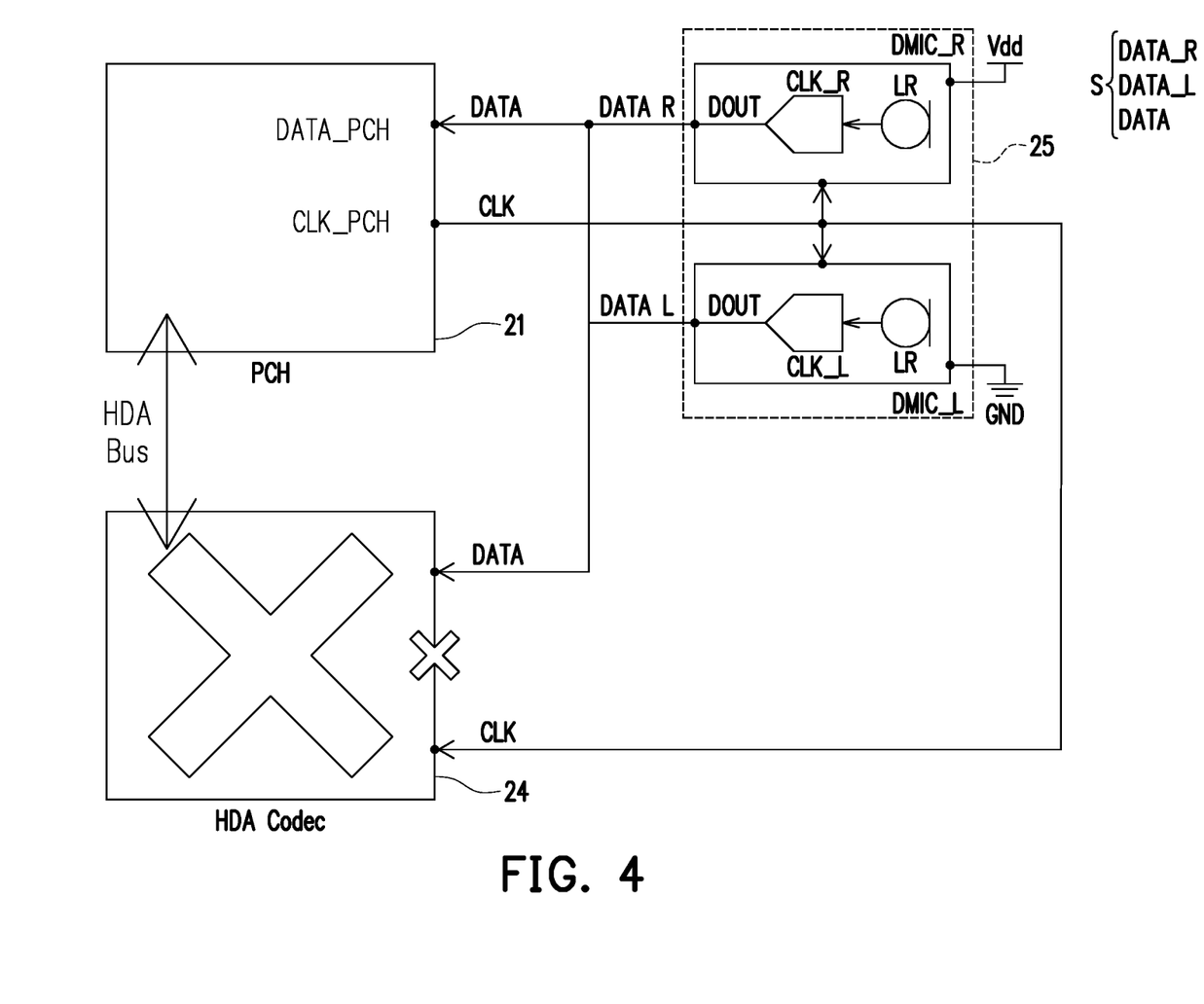
FIG. 4 is a hardware architecture diagram of a power saving state according to an embodiment of the application.

For example, FIG. 4 is a hardware architecture diagram of a power saving state according to an embodiment of the application. Referring to FIG. 4, the HDA codec 24 is turned off. The path between PCH 21 and digital microphone 25 is a normal transmission structure. That is, the clock signal CLK and the sound signal DATA can be transmitted normally. The data of the sound signal DATA may include the left channel signal DATA_L and the right channel signal DATA_R at the same time, and send it to the data pin DATA_PCH.

Figure 5:
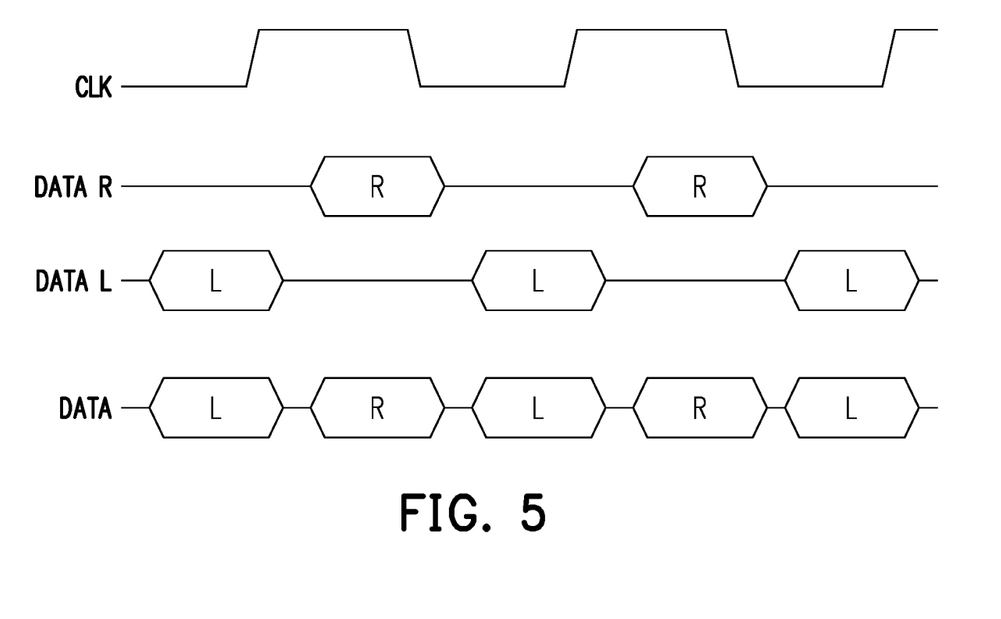
FIG. 5 is a signal timing diagram according to an embodiment of the application.

For example, FIG. 5 is a signal timing diagram according to an embodiment of the application. Referring to FIG. 5, the PCH 21 can determine that the sound signal DATA is one of the left channel signal DATA_L (abbreviated as L in the figure) and the right channel signal DATA_R (abbreviated as R in the figure) according to the level of the clock signal CLK. For example, the low-level clock signal CLK represents the left channel signal DATA_L, and the high-level clock signal CLK represents the right channel signal DATA_R.

In another embodiment, in response to the power state of the computer system 2 being in a working state, the HDA codec is enabled. The PCH 21 disables its data pin DATA_PCH, and the HDA codec 24 determines that the sound signal DATA from the digital microphone 25 is one of the left channel signal DATA_L and the right channel signal DATA_R according to the clock signal CLK of the PCH 21. The term "enable" means that all or part of the functionality is working properly and not restricted. For example, the clock signal CLK and the sound signal DATA can be normally transmitted to the corresponding pins.

Figure 6:
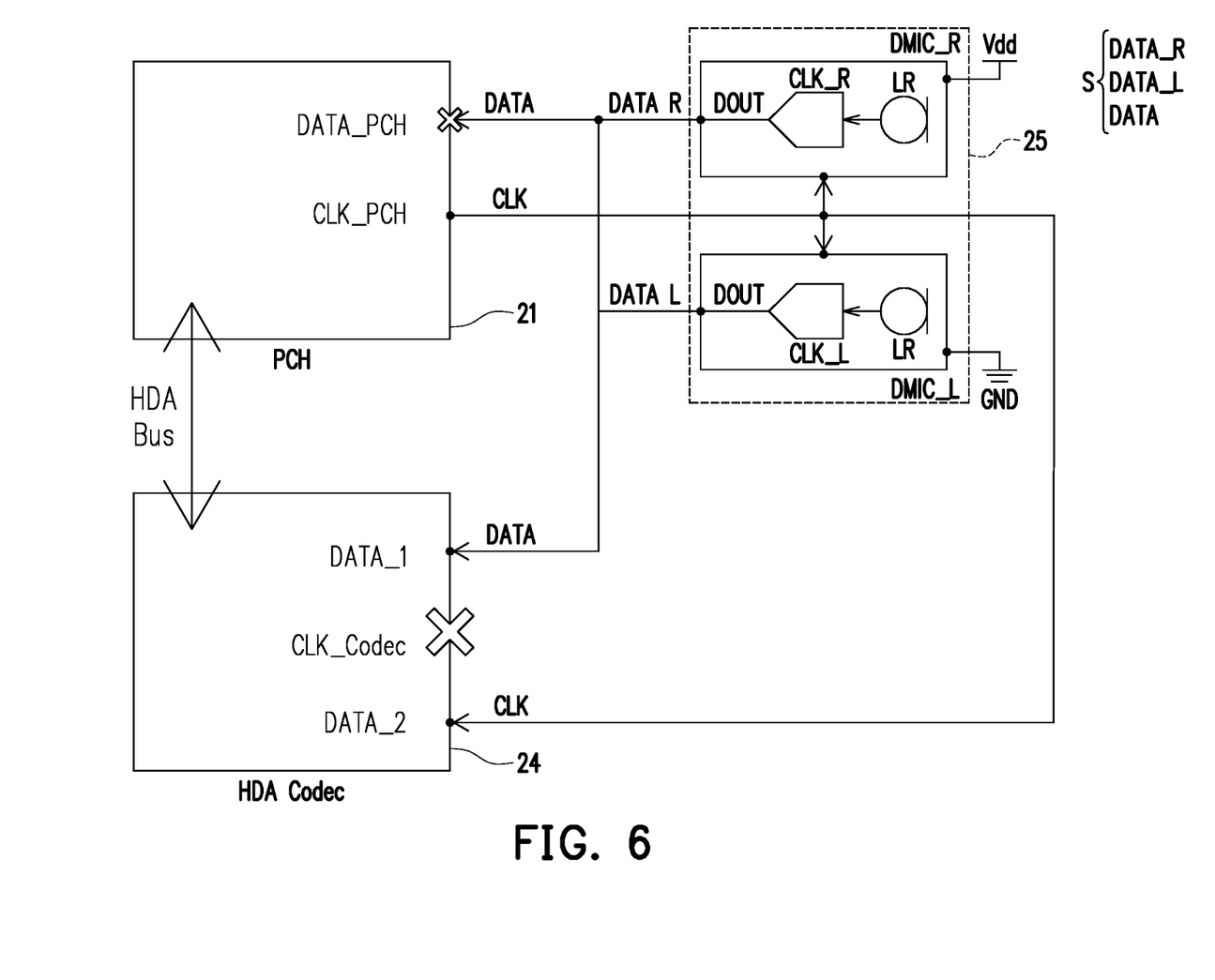
FIG. 6 is a hardware architecture diagram of a working state according to an embodiment of the application.

For example, FIG. 6 is a hardware architecture diagram of a working state according to an embodiment of the application. The data pin DATA_PCH of PCH 21 is turned off, so that the PCH 21 cannot/does not receive the sound signal DATA from digital microphone 25. Besides, the PCH 21 enables the HDA codec 24.

The data of the sound signal DATA includes both the left channel signal DATA_L and the right channel signal DATA_R, and is transmitted to the data pin DATA_1.

In an embodiment, the HDA codec 24 directly uses the clock signal CLK to determine that the sound signal DATA received via its data pin DATA_1 is one of the left channel signal DATA_L and the right channel signal DATA_R. As shown in FIG. 5, the high and low levels of the clock signal CLK distinguish the right channel signal DATA_R and the left channel signal DATA_L.

In another embodiment, the HDA codec 24 synchronizes the clock signal CLK of the PCH 21 to generate a new clock signal. At this time, the HDA codec 24 does not directly use the clock signal CLK to distinguish the left channel signal DATA_L and the right channel signal DATA_R. The HDA codec 24 determines that the sound signal DATA received through its data pin DATA_1 is one of the left channel signal DATA_L and the right channel signal DATA_R according to the new clock signal.

Figure 7:
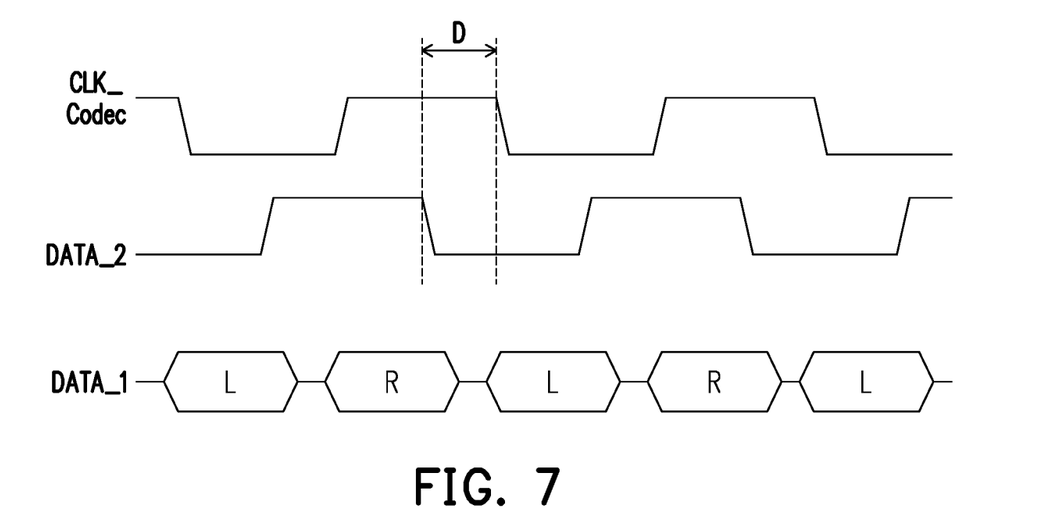
FIG. 7 is a signal timing diagram according to an embodiment of the application.

For example, FIG. 7 is a signal timing diagram according to an embodiment of the application. Referring to FIG. 7, the HDA codec 24 can match the clock frequency of its clock pin CLK Codec with the clock frequency of the PCH 21 (e.g., 3.2 MHz). And the delay time D of the clock signal of the HDA codec 24 is adjusted, so that the new clock signal of the HDA codec 24 is synchronized with the clock signal CLK of the data pin DATA_2. Next, the HDA codec 24 directly uses the new clock signal to determine that the sound signal DATA received through its data pin DATA_1 is one of the left channel signal DATA_L and the right channel signal DATA_R. As shown in FIG. 5, the level of the new clock signal distinguishes the right channel signal DATA_R and the left channel signal DATA_L.

Figure 8:
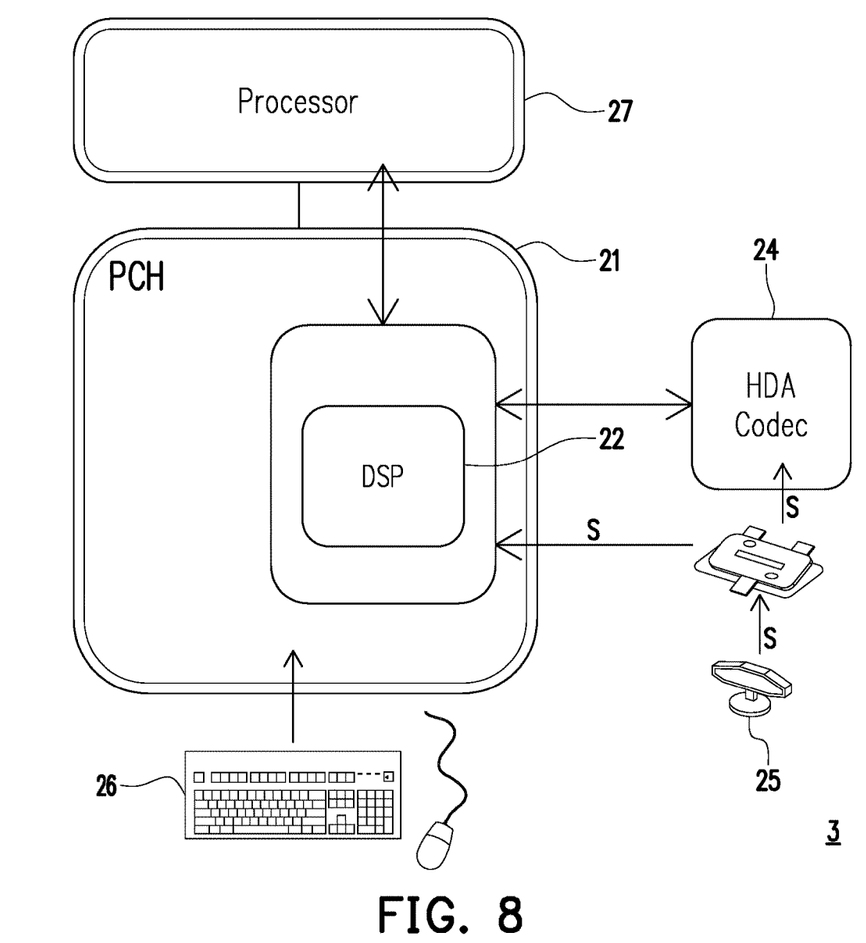
FIG. 8 is a schematic diagram of components of a computer system according to an embodiment of the application.

In addition to the connection of the PDM transmission interface, the embodiments of the present invention also provide other connection methods. FIG. 8 is a schematic diagram of components of a computer system 3 according to an embodiment of the application. Referring to FIG. 2 and FIG. 8, the difference from FIG. 2 is that the computer system 3 includes a switch 28. The switch 28 is coupled to the digital microphone 25 and selectively coupled to one of the HDA codec 24 and the PCH 21.

In an embodiment, the digital microphone 25 is coupled to one of the PCH 21 and the HDA codec 24 through the switch 28 according to the power state of the computer system 3. In response to the power state of the computer system 3 being in a power saving state, the switch 28 connects the connection between the digital microphone 25 and the PCH 21. That is, the digital microphone 25 is connected to the PCH 21 through the switch 28. The switch 28 disconnects the digital microphone 25 from HDA codec 24. Besides, the PCH 21 can turn off the HDA codec 24 to save power.

On the other hand, in response to the power state of the computer system 3 being in a working state, the switch 28 conducts the connection between the digital microphone 25 and the HDA codec 24. That is, the digital microphone 25 is connected to the HDA codec 24 through the switch 28. Thereby, the quality of audio processing can be improved. Besides, the switch 28 disconnects the digital microphone 25 from the PCH 21.

Figure 9:
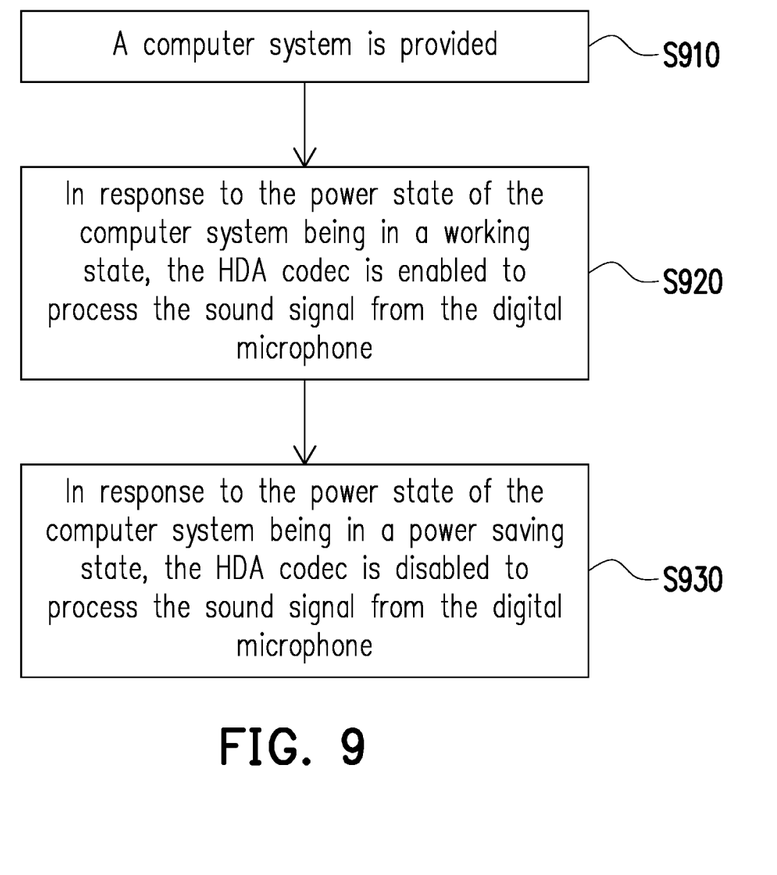
FIG. 9 is a flowchart of a method for processing a sound signal according to an embodiment of the application.

FIG. 9 is a flowchart of a method for processing a sound signal according to an embodiment of the application. Referring to FIG. 9, the computer system 2 of FIG. 2 or the computer system 3 of FIG. 8 is provided (step S910). In response to the power state of the computer system 2/3 being in a working state, the HDA codec 24 is enabled to process the sound signal S from the digital microphone 25 (step S920). In response to the power state of the computer system 2/3 being in a power saving state, the HDA codec 24 is disabled to process the sound signal S from the digital microphone 25 (step S930).

The implementation details of each step in FIG. 9 have been described in detail in the foregoing embodiments and implementations, and will not be repeated here. In addition to being implemented in the form of a circuit, some or all of the steps and implementation details of the embodiments of the application may also be implemented by the processing unit in the form of software, which is not limited by the embodiments of the application.

In an embodiment, in response to the power state of the computer system 2/3 being in a working state, the HDA codec 24 processes the sound signal from the digital microphone 25 according to the functional configuration. This functional configuration belongs to one of several usage scenarios, and the functional configuration includes sampling rate, beam direction, channel and/or sensitivity. The sampling rate is for example 48 kHz, 96 kHz or 192 kHz. The beam direction is for example omnidirectional, bidirectional or Omni-Stereo. The channel is for example mono or stereo. The sensitivity is for example −26 dBV/Pa or −37 dBV/Pa. The usage scenario is, for example, the beam direction and/or application (e.g., voice application, communication application or streaming) of the digital microphone 25.

Table (1) is an example to illustrate the corresponding relationship between the usage scenarios and the functional configurations:

TABLE 1

| | usage scenarios functional configurations | | | | | |
|---|---|---|---|---|---|---|
| | Home/Live Recording | Interview | Stereo recording | Live streaming | Voice calls | Conference calls |
| Beam direction | omnidirectional | bidirectional | omnidirectional | unidirectional | unidirectional | omnidirectional |
| Channel | mono | mono | stereo | mono | mono | mono |
| Sampling rate | 96 kHz | 96 kHz | 96 kHz | 96 kHz | 96 kHz | 96 kHz |
| Sensitivity | −37 dBV/pa | −37 dBV/pa | −37 dBV/pa | −37 dBV/pa | −21 dBV/pa | −21 dBV/pa |

Figure 10:
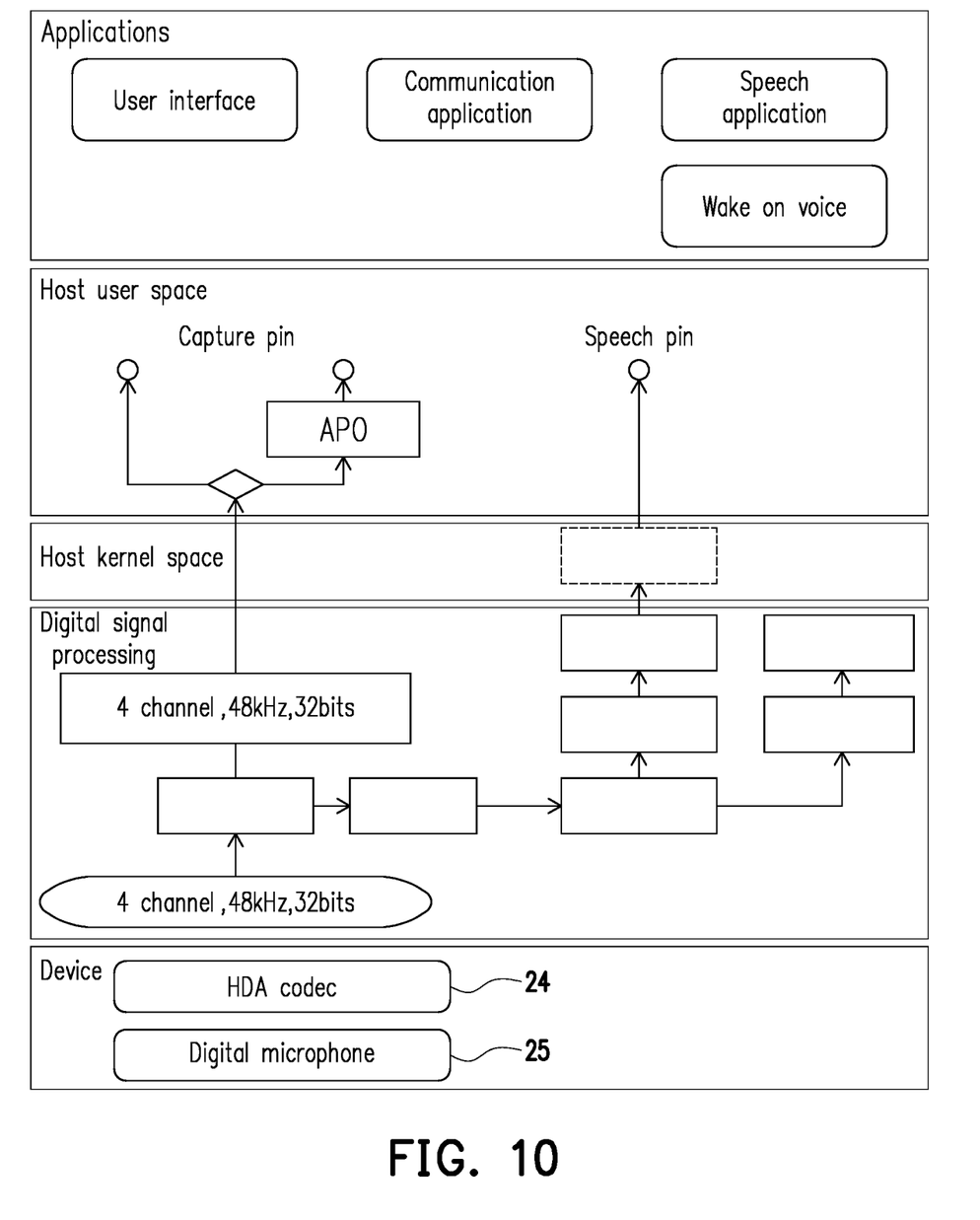
FIG. 10 is an audio architecture diagram of a working state according to an embodiment of the application.

FIG. 10 is an audio architecture diagram of a working state according to an embodiment of the application. Referring to FIG. 10, in the working state, the Wake on Voice service can be disabled in the basic input/output system (BIOS). At this time, since the HDA codec 24 can provide a sampling rate of 192 kHz, the HDA codec 24 and the digital microphone 25 can support a sampling rate of 96 kHz when connected. Therefore, applications such as communication, voice, etc. can use sound signals with a sampling rate of 96 kHz. The sampling rate of 48 kHz is used as shown in FIG. 10.

In addition, Table (2) is the correspondence between the beam direction/application and the sensitivity gain (provided by an Audio Processing Object (APO) in the host user space):

TABLE 2

|  | Standard | Omnidirectional | Unidirectional | Omni-stereo | Speech application |
|---|---|---|---|---|---|
| Low Sensitivity (−37 dBV/pa) | −12 dB | −12 dB | −12 dB | −12 dB | 0 dB |
| High Sensitivity (−26 dBV/pa) | 0 dB | 0 dB | 0 dB | 0 dB | 0 dB |

In an embodiment, in response to the power state of the computer system 2/3 being in a power saving state, the HDA codec 24 may be turned off. Therefore, the sound signal from the digital microphone 25 cannot be processed according to the functional configuration corresponding to the usage scenario. That is, the HDA codec 24 is disabled to process the sound signal S from the digital microphone 25 according to the functional configuration defined by the usage scenario. For example, the digital microphone 25 only supports default functional configuration. The default functional configuration is, for example, unidirectional beam direction, 48 kHz sampling rate, mono and −21 dB sensitivity.

Figure 11:
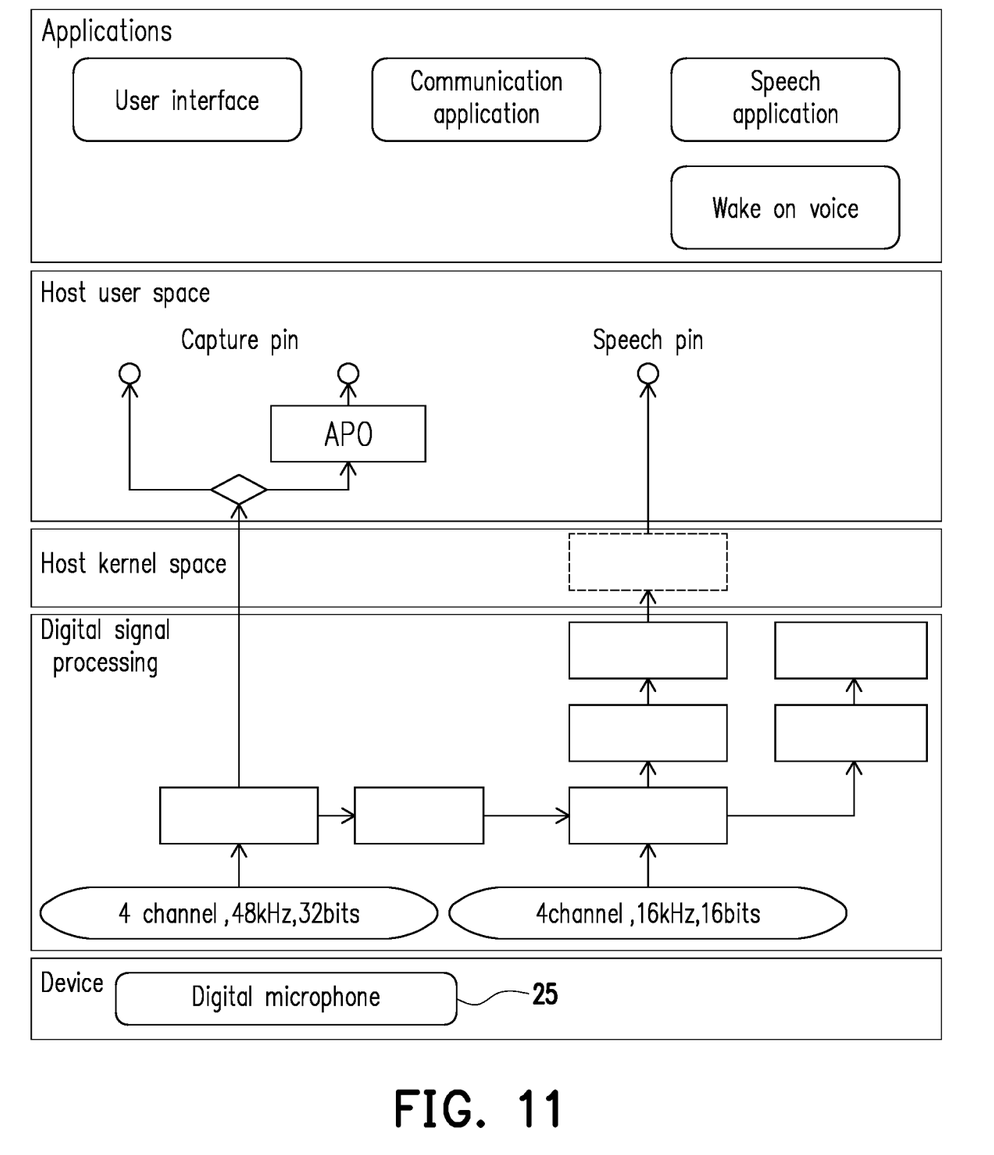
FIG. 11 is an audio architecture diagram of a power saving state according to an embodiment of the application.

FIG. 11 is an audio architecture diagram of a power saving state according to an embodiment of the application. Referring to FIG. 11, in the power saving state, the Wake on Voice service can be enabled in BIOS. At this time, since the HDA codec 24 is turned off, the sampling rate of 96 kHz cannot be supported when the HDA codec 24 and the digital microphone 25 are not connected. For example, only sampling rates up to 48 kHz are supported. Therefore, applications such as communication, voice, etc. can use sound signals with a sampling rate of up to 48 kHz. The speech application shown in FIG. 11 uses only a 16 kHz sample rate.

In an embodiment, the processor 27 can select the usage scenario according to the user operation received by the input device 26. That is to say, the embodiment of the application allows users to select usage scenarios and set corresponding functional configurations accordingly.

Figure 12:
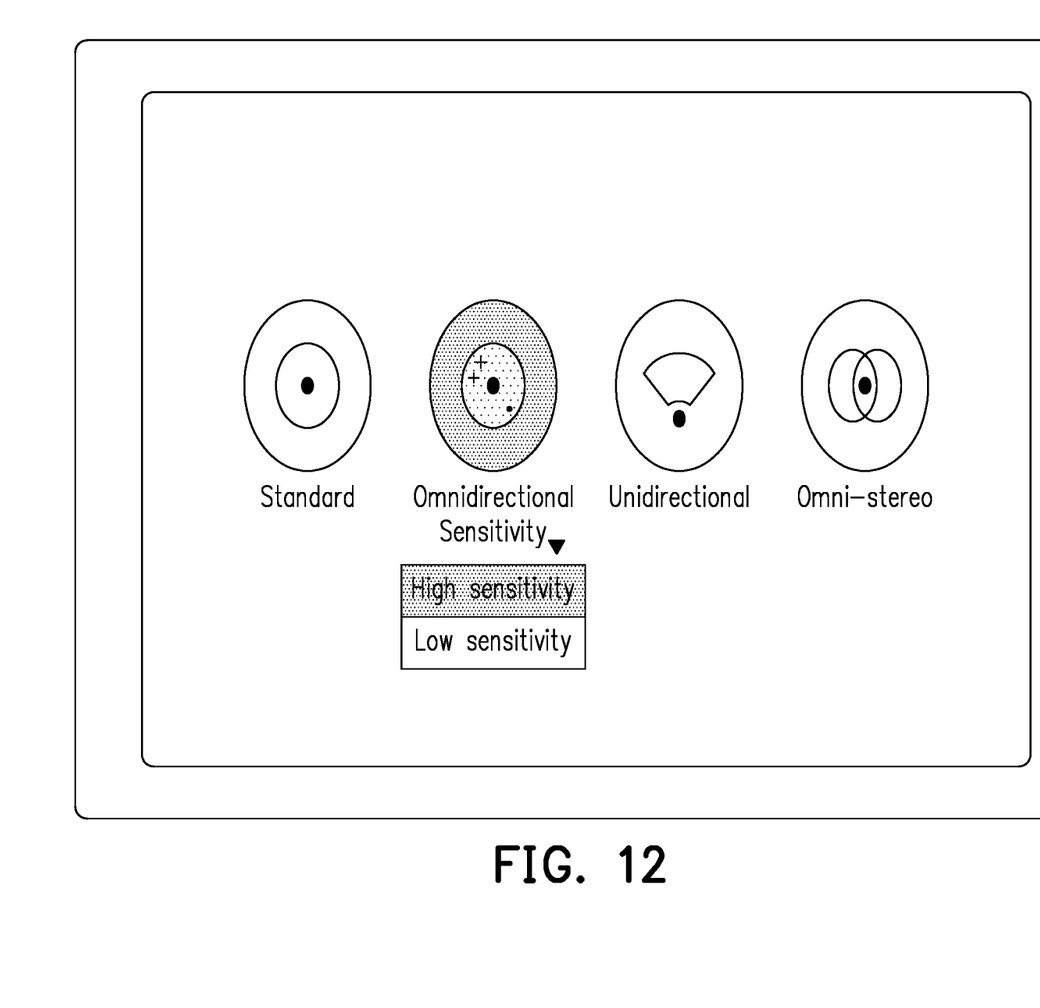
FIG. 12 is a user interface of a functional configuration according to an embodiment of the application.

For example, FIG. 12 is a user interface of a functional configuration according to an embodiment of the application. Referring to FIG. 12, the usage scenarios are for beam direction. For example, Standard, Omnidirectional, Unidirectional and Omni-stereo. Different sensitivities are also available for different beam directions. According to the user's selection on the user interface, the usage scenario and/or functional configuration can be determined. For example, Table (3) is a correspondence between beam direction, sensitivity and application:

In summary, according to the computer system and the processing method thereof of sound signal of the application, the digital microphone and the HDA codec can be connected through a clock signal serial connection or a switch. Thereby, HDA recording can be provided. In addition, when the computer system is in a power-saving state, the HDA codec can be disabled to process the sound signal from the digital microphone, thereby saving power.

Although the present invention has been disclosed above by the embodiments, it is not intended to limit the present invention, and any person with ordinary knowledge in the technical field is not intended to limit the present invention. Slight changes and modifications may be made without departing from the spirit and scope of the present invention, so the protection scope of the present invention should be determined by the following claims.

What is claimed is:

1. A computer system comprising:
    a platform path controller (PCH);
    a high-definition audio (HDA) codec, coupled to the PCH; and
    a digital microphone, coupled to the PCH and the HDA codec, used to generate a sound signal
    wherein the HDA codec processes the sound signal from the digital microphone,
    a data pin of the digital microphone is coupled to a data pin of the PCH and a first data pin of the HDA codec, and the PCH receives the sound signal from the digital microphone via its data pin or the HDA codec receives the sound signal from the digital microphone via the first data pin; and
    a clock pin of the PCH is coupled to a clock pin of the digital microphone and a second data pin of the HDA codec, and the PCH provides a clock signal to both the digital microphone and the HDA codec via its clock pin.

2. The computer system according to claim 1, wherein in response to a power state of the computer system being in a power saving state, the HDA codec is disabled.

3. The computer system according to claim 1, wherein in response to a power state of the computer system being in a working state, the HDA codec is enabled,

TABLE 3

|  | Standard | Omnidirectional | Unidirectional | Omni-stereo |
|---|---|---|---|---|
| Low Sensitivity (−37 dBV/pa) | Without noise suppression, echo cancellation and noise cancellation | Sound around the microphone, Instrument | Sound in front of microphone, Instrument | Real sound, Instrument |
| High Sensitivity (−26 dBV/pa) | With noise suppression, echo cancellation and noise cancellation | Multiplayer Streaming, Conference calls, Noise cancellation | Live Streaming, Noise cancellation |  | the PCH disables its data pin, and the HDA codec determines that the sound signal received from the digital microphone is one of a left channel signal and a right channel signal according to the clock signal of the PCH.

4. The computer system according to claim 3, wherein the HDA codec directly uses the clock signal to determine that the sound signal received through the first data pin is one of the left channel signal and the right channel signal.

5. The computer system according to claim 3, wherein the HDA codec synchronizes the clock signal of the PCH to generate a new clock signal, and determines that the sound signal received through the first data pin is one of the left channel signal and the right channel signal according to the new clock signal.

6. The computer system according to claim 1, further comprising:
a switch, wherein the digital microphone is coupled to one of the PCH and the HDA codec through the switch according to a power state of the computer system.

7. The computer system according to claim 1, wherein in response to a power state of the computer system being in a working state, the HDA codec processes the sound signal from the digital microphone according to a functional configuration, wherein the functional configuration belongs to one of a plurality of usage scenarios.

8. The computer system according to claim 7, wherein the functional configuration comprises at least one of sampling rate, beam direction, channel, and sensitivity.

9. The computer system according to claim 7, wherein in response to a power state of the computer system being in a power saving state, the HDA codec is disabled to process the sound signal from the digital microphone according to the functional configuration.

10. A method for processing a sound signal, comprising:
providing a computer system as claimed in claim 1;
in response to a power state of the computer system being in a working state, enabling the high-definition audio (HDA) codec to process the sound signal from the digital microphone; and
in response to the power state of the computer system being in a power saving state, disabling the HDA codec to process the sound signal from the digital microphone.

11. The method according to claim 10, wherein in response to the power state of the computer system being in the working state, the method further comprises:
disabling the data pin of the PCH which is coupled with the data pin of the digital microphone, and
determining, by the HDA codec, that the sound signal received from the digital microphone is one of a left channel signal and a right channel signal according to the clock signal of the PCH.

12. The method according to claim 11, further comprising:
directly using, by the HDA codec, the clock signal to determine that the sound signal received from the digital microphone is one of the left channel signal and the right channel signal.

13. The method according to claim 11, further comprising:
synchronizing, by the HDA codec, the clock signal of the PCH, to generate a new clock signal; and
determining, by the HDA codec, that the sound signal received from the digital microphone is one of the left channel signal and the right channel signal according to the new clock signal.

14. The method according to claim 10, further comprising:
switching a connection between the digital microphone with one of the PCH and the HDA codec according to a power state of the computer system.

15. The method according to claim 10, wherein in response to a power state of the computer system being in the working state, the method further comprises:
processing, by the HDA codec, the sound signal from the digital microphone according to a functional configuration, wherein the functional configuration belongs to one of a plurality of usage scenarios.

16. The method according to claim 15, wherein the functional configuration comprises at least one of sampling rate, beam direction, channel, and sensitivity.

17. The method according to claim 15, wherein in response to a power state of the computer system being in the power saving state, the method further comprises:
disabling, the HDA codec, to process the sound signal from the digital microphone according to the functional configuration.

* * * * *